Oct. 28, 1969    G. N. CATRAVAS    3,474,908
CHROMATOGRAPHY APPARATUS
Filed Dec. 23, 1965
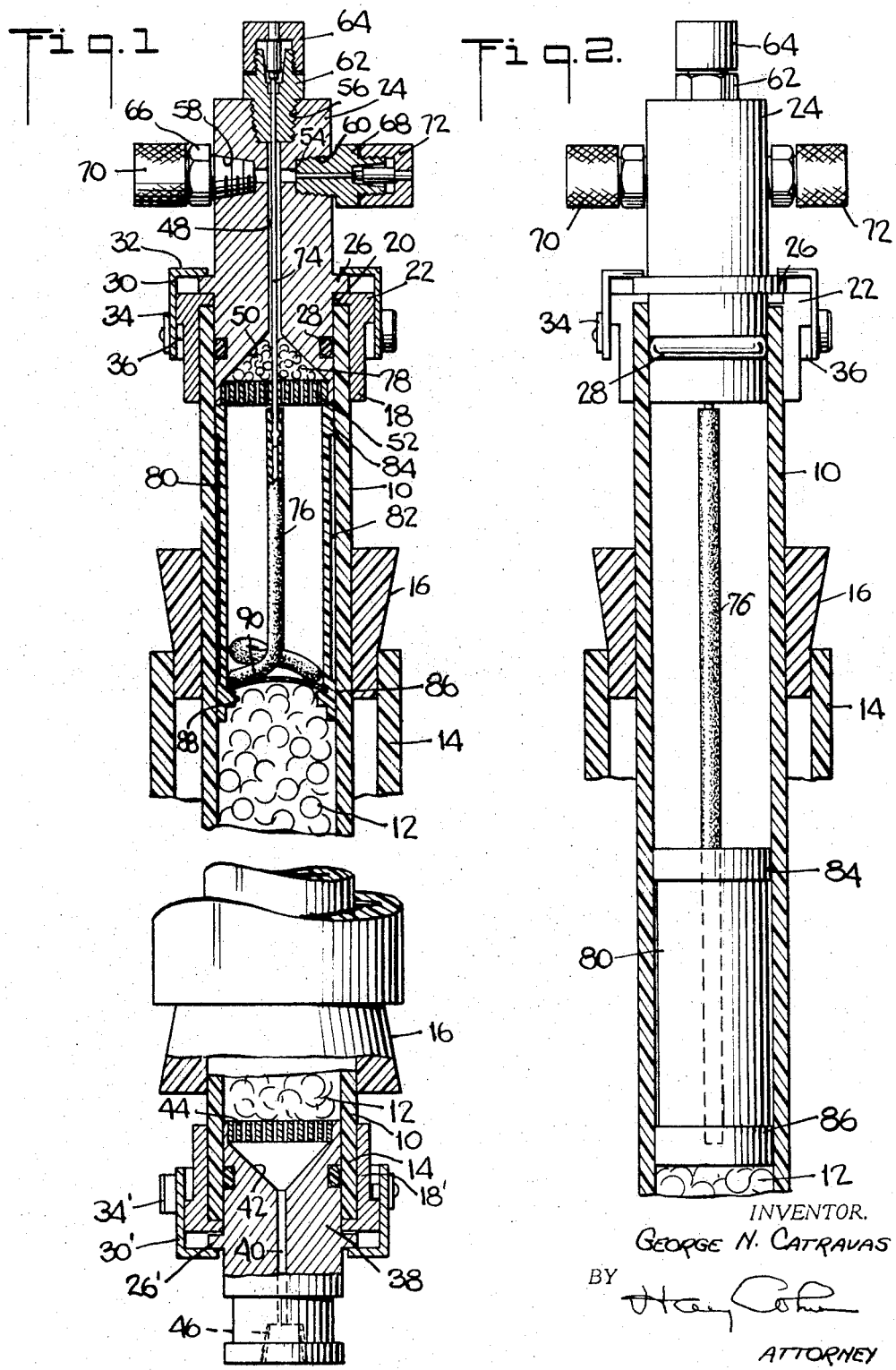
INVENTOR.
GEORGE N. CATRAVAS
BY
ATTORNEY United States Patent Office 3,474,908
Patented Oct. 28, 1969

3,474,908
CHROMATOGRAPHY APPARATUS
George N. Catravas, Yonkers, N.Y., assignor to Technicon Corporation, a corporation of New York
Filed Dec. 23, 1965, Ser. No. 523,494
Int. Cl. B01d *15/08;* G01n *31/08*
U.S. Cl. 210—198                    3 Claims

ABSTRACT OF THE DISCLOSURE

An apparatus is disclosed for introducing a liquid sample into a chromatography column which includes a flexible sample input tube and a perforate member which rides on the top of the ion exchange resin column. One end of the sample input tube communicates with the exterior of the chromatography column and is of sufficient length such that the other end rests upon the perforate member. Accordingly, liquid sample introduced along the sample input tube is directed at an angle to the plane of the perforate member and the surface of the resin column whereby disturbance of the resin column is minimal.

---

This invention relates to an apparatus for the introduction of samples into a chromatography column at the top of the ion exchange resin contained therein.

Customarily, the sample which is to be chromatographically separated is layered on to the top of and forced into the ion exchange resin in the column which already contains a buffer solution. This sample may be dissolved in a sucrose solution. Subsequently a stream of buffer solution is forced into the top of the column to elute the sample through the column.

In U.S. Patent No. 3,346,486, issued to George D. Winter and George N. Catravas, on Oct. 10, 1967 and assigned to a common assignee, there is disclosed an apparatus and a method for conveniently and rapidly inserting the sample, when it is dissolved in a sucrose solution, into the column. Briefly, the sucrose has a higher density than the buffer which is already in the column, and as the sucrose sample solution is inserted into the column, the displaced volume of buffer solution overflows out of the column. This arrangement serves admirably when the sample solution has a higher density than the buffer solution. When the sample solution has a lower density than the buffer solution it is necessary to first remove a volume of the buffer solution before adding the sample solution. Such a situation arises when it is desired to dissolve the sample in the buffer solution before it is inserted into the column. The operation of the column is further complicated by the fact that the resin tends to swell or contract depending on the pH. of the solution which it is contacting, thus raising or lowering the top level of the resin in the column.

To preclude disturbing the resin in the upper portion of the column, to permit the rapid and convenient insertion of the sample liquid, and to preclude the top level of the resin from rising above a predetermined level and into the fittings at the upper end of the column, I have provided a new structure for inserting the sample solution into the column.

A feature of this apparatus includes the provision of a perforate member which rides on the top of the column and bears against and is supported by the top layer of the resin, and a flexible sample inlet tube which is of adequate length to always reach said perforate member.

These and other objects, features and advantages of this invention will become more apparent upon consideration of the following specification, taken in conjunction with the accompanying drawing in which:

FIG. 1 is a view in elevation, partially in cross-section, of a chromatography column embodying the invention, showing the top level of the resin in the column at its maximum; and FIG. 2 is a view in elevation, partially in cross-section, of the column of FIG. 1, showing the top level of the resin in the column at its minimum.

The chromatography column assembly includes an inner tube 10 which contains a column of an ion exchange resin 12, and which is supported in and spaced from an outer tube 14 by a pair of gaskets 16. The outer tube has an inlet and an outlet, not shown, for a heating liquid.

An inner collar 18, having an upper inner flange 20 and an upper outer flange 22, is fixed, as by cementing, to the upper end of the tube 10. A plug body 24, having an annular flange 26 and an annular gasket 28, is releasably sealed into the upper end of the tube, and is held in place by a removable outer collar 30 having an upper inner flange 32. The collar 30 is releasably held to the collar 18 by a snap ring 34 having bayonet pins 36 which pass through respective apertures in the collar 30 and fit under the flange 22.

A plug body 38 having a similar flange 26' and a gasket 28' is releasably sealed into the lower end of the tube 10 by a similar inner collar 18', an outer collar 30' and a snap ring 34'. The plug body 38 has an axial bore 40 with an upper enlargement 42 which receives and supports a perforate plate 44, and a lower enlargement 46 which is internally threaded to receive a tubular fitting or nipple, not shown.

The plug body 24 has an axial bore 48 which has a lower enlargement 50 which receives and supports a perforate plate 52, and has an intersecting diametrical bore 54. The upper end of the axial bore 48 and the two ends of the diametrical bore 54 have a respective internally threaded enlargement 56, 58 and 60. The enlargement 56 has secured therein a "Leur-Lok" nipple 62 and a cap 64. The enlargements 58 and 60 have respective nipples 66 and 68 and caps 70 and 72. A tube 74, which may be of stainless steel, is fixed through the nipple 62, passes with clearance through the bore 48, and is fixed through and beyond the perforate plate 52. The upper end of a limp, flexible tube 76 is fixed to the lower end of the tube 74. A plurality of spherical beads 78 are disposed above the plate 52 in the bore enlargement 50.

A short tube 80 is disposed within and closely fits the tube 10 for vertical movement therein. The medial portion 82 of the periphery of the tube is relieved to provide an upper annular bearing surface 84 and a lower annular bearing surface 86. The tube has an inner annular flange 88 which supports and is secured to a mesh or perforate disk 90. The tube 80 rides within the tube 10 on top of the top layer of the resin column 12. The relieved portion 82 serves to receive any trapped particles of resin which pass between the tube 84 and the tube 10, to ensure free riding of the tube 80 within the tube 10 as the height of the top layer of the resin column varies. At maximum extension of the resin column, the upper end of the tube 80 abuts the lower end of the plug 24, and any further tendency to extension results in a compressive load on the resin column. At lesser extensions of the resin column the tube 80 follows the fall of the resin column, and the limp tube 76 unwinds so that its lower end remains adjacent the perforate disk 90. In use, the tube 10 is initially filled with a buffer solution. The sample is dissolved in a buffer solution. The plug body 24 including the limp tube 76 is easily removed from the tube 10 subsequent to the release of the snap ring 34. A volume of buffer solution is removed from the upper end of the tube 10 to empty the tube 80 thereof, and the plug body is restored. Alternatively, the plug body 24 may be left in the tube 10, and this volume of buffer solution may be withdrawn by suction through nipple 62, as by a syringe, while cap 72 is removed to admit air. The cap 64 is removed from the "Leur-Lok" nipple 62 and a syringe, containing the sample dissolved in buffer solution, is fitted to the nipple 62. The sample solution is inserted into upper end of the tube 10 through the tubes 74 and 76, while the cap 72 is removed to pass air out. The lower end of the tube 76 rests on perforate disk 86 and the sample solution is gently layered through the disk onto the top of the resin column. The cap 64 is restored, the cap 72 remains removed and a source of gas under pressure is coupled to the nippled 68 to force the sample liquid into the upper portion of the resin column. The cap 72 is restored, the cap 70 is removed and a source of buffer solution under pressure is coupled to the nipple 66 to strip the sample liquid through the resin column and out through the lower bore 40. The glass beads 78 serve to uniformly distribute the buffer solution over the cross-section of the resin column as disclosed in my U.S. Patent No. 3,334,514, issued on Aug. 8, 1967 and assigned to a common assignee.

The sliding tube 80 with its perforate disk 90 serves to protect the top of the resin column from disturbance and to preclude the expansion of the column beyond the maximum level into the upper fittings of the column.

While there has been shown and described the preferred embodiment of the invention, it will be understood that the invention may be embodied in other ways which will occur to those skilled in the art in view of the present disclosure; therefore, it will be understood that the invention is not limited exactly as hereinbefore described, except as may be required by the scope of the appended hereto claims.

What is claimed is:

1. Chromatography apparatus for the analysis of a sample liquid comprising: a chromatography column tube; an ion exchange resin column disposed in said chromatography tube, an additional tube disposed in freely sliding contact within said chromatography tube and above said resin column, said additional tube having a perforate member closing one end of said additional tube and disposed on and freely supported by the top of said resin column whereby an increase in the height of said resin column elevates said additional tube and a decrease in the height of said resin column lowers said additional tube; and sample liquid inlet means adjacent to said perforate member and disposed to introduce liquid into said chromatography column and at an angle to said perforate member so as to minimize distrubance of said resin column, said sample liquid inlet means including a sample insertion tube having an inlet portion coupled to the top of said chromatography column for receiving sample liquid to be introduced into said column and having a limp flexible outlet portion disposed on, substantially parallel with and freely supported by said perforate member, the length of said sample insertion tube being of adequate length such that said outlet portion is supported by said perforate member during the entire vertical movement of said additional tube.

2. Chromatography apparatus according to claim 1, further including an inlet assembly coupled to the top of said chromatography tube, said assembly including a plug body, a longitudinal bore through said body providing access into said chromatography tube and a lateral bore in said body intersecting said longitudinal bore, said sample insertion tube secured within, with clearance, and through said longitudinal bore, whereby a sample fluid may be introduced into said chromatogarphy tube through said sample tube and an additional fluid may be introduced into said chromatography tube through said lateral and longitudinal bores in combination.

3. Chromatography apparatus according to claim 1, further including an inlet assembly releasably coupled to the top of said chromatography tube, and assembly including a plug body, a longitudinal bore through said body having an inlet end with a removably closure therefor and an outlet end providing access into said chromatography tube, a lateral bore through said body intersecting said longitudinal bore having two inlet ends each with a removable closure therefor, said sample insertion tube secured within and through said longitudinal bore, and having clearance in said bore between said bore's intersection with said lateral bore and said bore's outlet end, whereby a sample fluid may be introduced into said chromatography tube through said sample tube and additional fluids may be introduced through said lateral and longitudinal bores in combination.

References Cited

UNITED STATES PATENTS

| | | | |
|---|---|---|---|
| 3,265,215 | 8/1966 | Emneus et al. | 210—209 X |
| 3,334,514 | 8/1967 | Catravas | 73—23.1 |
| 3,346,486 | 10/1967 | Winter et al. | 210—31 |

SAMIH N. ZAHARNA, Primary Examiner

U.S. Cl. X.R.

210—282, 287